United States Patent [19]
Yoshio et al.

[11] 3,890,625
[45] June 17, 1975

[54] LONG-TIME EXPOSURE APPARATUS FOR CAMERA

[75] Inventors: Kuramoto Yoshio, Toyonaka; Kobori Toshio, Sakai, both of Japan

[73] Assignee: Minolta Camera Kabushiki Kaisha, Osaka, Japan

[22] Filed: Aug. 23, 1973

[21] Appl. No.: 390,818

[30] Foreign Application Priority Data
Sept. 12, 1972  Japan................................ 47-92153
Sept. 12, 1972  Japan................................ 47-92154

[52] U.S. Cl.................................. 354/51; 354/258
[51] Int. Cl........................... G03b 7/02; G03b 9/58
[58] Field of Search............ 95/10 CT, 53 E, 53 EB; 354/26, 48, 50, 51, 234, 266, 267, 258

[56] References Cited
UNITED STATES PATENTS
3,687,026  8/1972  Kobayashi et al. ........... 95/53 EB X
3,728,952  4/1973  Kiyohara ............................ 354/51
3,733,984  5/1973  Yata ................................... 354/51

*Primary Examiner*—Samuel S. Matthews
*Assistant Examiner*—James A. LaBarre
*Attorney, Agent, or Firm*—Wolder & Gross

[57] ABSTRACT

An apparatus includes an exposure time setting member for setting an exposure time within an ordinary range and a long-time exposure setting member for setting a longer exposure time. Long-time exposures can be set only when the exposure time setting member is set in a specified position. The setting members are so adapted that only when at least one of them is set in the specified position, the other is rendered operable. The setting members operate an exposure time control element of an exposure time control electric circuit for controlling the exposure time in accordance with the time constant of a delay circuit to vary the time constant. For setting long-time exposures, the time constant is increased by an increased capacity of capacitor.

16 Claims, 10 Drawing Figures

LONG-TIME EXPOSURE APPARATUS FOR CAMERA

BACKGROUND OF THE INVENTION

This invention relates to a long-time exposure apparatus for cameras, more particularly to an apparatus for setting long-time exposures longer than exposure times (for example, ranging from 1/2000 to 1 second) set for ordinary photographing operations.

Conventional cameras adapted to take photographs with long-time exposures employs a self-timer to mechanically control the exposure time, the construction being such that the shutter speed setting member is set for bulb exposure before setting the exposure time, with the shutter button seat set for time exposure, and the desired exposure time is thereafter set by the self-timer. Thus the procedure is complex and troublesome to follow and involves a possible error.

On the other hand, to make a long-time exposure with a camera including an electronic shutter by a conventional method wherein the resistivity of a delay circuit incorporated in the exposure time control circuit is varied by only one exposure time setting member to control the exposure time, the resistivity of the circuit must be changed over a wide range. For example, a superlong exposure requires a resistivity of more than 10 megaohms. Thus it is very difficult to obtain a resistor which permits such a high resistivity setting as well as low resistivity settings for ordinary exposures. In this respect, the range of resistivity setting for the resistor, namely the range in which the exposure time is settable is consequently limited.

Furthermore, in the case where only one shutter speed dial is used as an exposure time setting member, it is extremely difficult to engrave shutter speed indications ranging from the longest exposure time to the shortest exposure time.

SUMMARY OF THE INVENTION

An object of this invention is to provide, in addition to an exposure time setting member for setting exposure times for ordinary photographing operations, a long-time exposure setting member for setting exposure times longer than the usual exposure times, the two exposure time setting members being rendered operable selectively at a specified position, so as to simplify the procedure for setting ordinary and long-time exposures and to eliminate errors in setting exposure times.

Another object of this invention is to change the time constant of a delay circuit included in the exposure time control circuit when setting long-time exposures from the time constant of the same for setting exposure times for ordinary photographic operations, mainly by changing the capacity of capacitor of the circuit so as to permit control for long-time exposures without using an additional self-timer.

According to this invention, the long-time exposure setting member is rendered operable only when the exposure time setting member is set in the specified position. Similarly, the exposure time setting member is made operable only when the long-time exposure setting member is set in the above-mentioned position. Consequently, at positions other than the specified position, only one of the setting members is operable with the other setting member held locked to the position where they are made operable selectively. The exposure setting procedure can therefore be followed without any error.

Further according to this invention, cameras in which a delay circuit included in the exposure time control electric circuit determines the exposure time are so adapted that the capacity of capacitor can be set at a higher value when setting a long-time exposure than when setting an ordinary exposure time, so that the resistivity of the variable resistance included in the delay circuit and serving as an exposure time control element need not be changed widely for the purpose of setting a superlong exposure time.

The present invention further makes it possible to provide the exposure time setting scale dividely at two positions, namely on the shutter speed dial serving as the exposure time setting member and on another portion opposing the long-time exposure setting member. This eliminates the aforementioned problem encountered in engraving the shutter speed indications. Furthermore, the present invention need not employ an additional self-timer or like exposure time control mechanism heretofore used and therefore simplifies the camera in its construction and improves its operativeness.

Other objects and features of this invention will become more apparent from the following description of an embodiment.

DESCRIPTION OF THE PREFERRED EMBODIMENT

Figure 2:
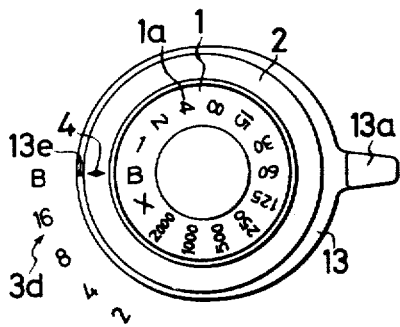
FIG. 2 is a plan view of FIG. 1.

The embodiment of this invention shown in the drawings is adapted for use with a camera incorporating an electronic shutter wherein the exposure time is set by varying the resistivity of a variable resistance of a delay circuit included in its exposure time control electric circuit. A shutter speed dial 1 serving as an exposure time setting member for setting exposure times (for example in the range of 1/2000 to 1 second and bulb exposure) for usual photographic operations is rotatably supported on an outer plate 3 of the camera with a bearing bush 2 interposed therebetween. As shown in FIG. 2, an exposure time scale 1a is engraved in the top surface of the dial 1 for setting shutter speeds ranging from 1/2000 to 1 second and bulb exposure. The dial 1 is rotated to set the scale 1a to an index mark 4 engraved directly in the bearing bush 2 fixed to the outer plate 3 (or in the outer plate 3) to set an exposure time for an ordinary photographic operation.

Figure 1:
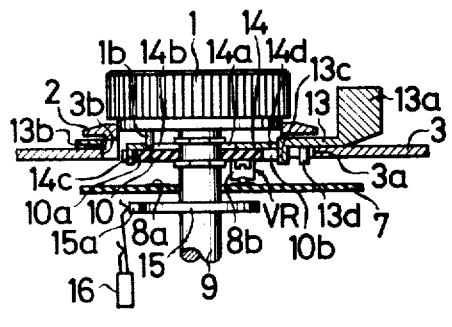
FIG. 1 is a view partly in vertical section showing the principal part of an embodiment of this invention.
Figure 3:
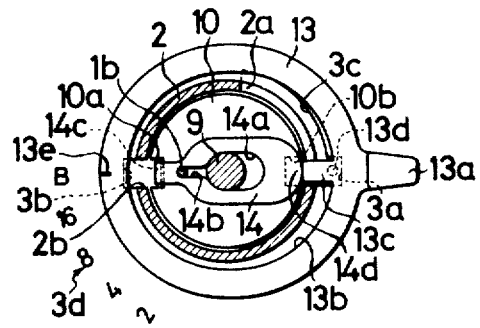
FIG. 3 is a plan view partly in cross section showing the same with part omitted.

Through a mechanism to be described later, the rotation of the shutter speed dial 1 varies the resistivity of a variable resistance VR serving as an exposure time control element of a delay circuit 6 included in an exposure time control electric circuit 5 shown in FIG. 8. As seen in FIG. 1, the variable resistance VR comprises a resistance element 8a fixedly mounted on a stationary base plate 7 made of an electrically insulating material and a slidable member 8b fixed to a disc 10 made of an electrically insulating material and loosely fitted around a shaft 9 of the dial 1 so as to be rotatable with the dial 1 by the mechanism to be described later. The rotation of the dial 1 changes the position of the slidable member 8b on the resistance element 8a to vary its resistivity. Generally, the delay circuit 6 comprises the aforementioned variable resistance VR and a capacitor C1. A change in the resistivity of the variable resistance VR alters the time constant and, during the operation to be described later, a switching circuit 11 included in the exposure time control circuit 5 is energized in accordance with the time of the time constant to control the current flowing through the winding of an exposure time control electromagnet 12 to take a photograph at the exposure time setting.

Further disposed under the shutter speed dial 1 is a long-time exposure setting member 13 which is supported by the bearing bush 2 rotatably and diametrically movably. The member 13 has an upwardly projecting manipulating piece 13a and is in the form of ring having an oblong hole 13b to fit around the bearing bush 2. The piece 13a is manipulated to move the member 13 diametrically and to rotate the same.

The disc 10 carries thereon a clutch plate 14 which is rotatable and slidable thereon in diametric directions. The clutch plate 14 is formed with an oblong guide hole 14a through which the shaft 9 extends and a driven slot 14b in which engages a pin 1b extending from the under surface of the exposure time setting member 1. The hole 14a and slot 14b are so positioned that their longitudinal centerlines are in alignment with the diametrical line of the disc 10. The clutch plate 14 further has a downwardly bent portion 14c at its one end on the above-mentioned diametric line.

The disc 10 is formed with a cutout 10a in which the bent portion 14c is engageable and another cutout 10b in which a projection 13c projecting from the long-time exposure setting member 13 inwardly thereof is engageable, the cutouts 10a and 10b being positioned on the same diametric line and formed in the peripheral edge of the disc 10 at its opposite sides. The clutch plate 14 is biased by an unillustrated spring so that the bent portion 14c usually engages in the cutout 10a, with the rear end 14d of the plate 14 positioned over the cutout 10b in which the projection 13c of the member 13 is engageable.

Figure 4:
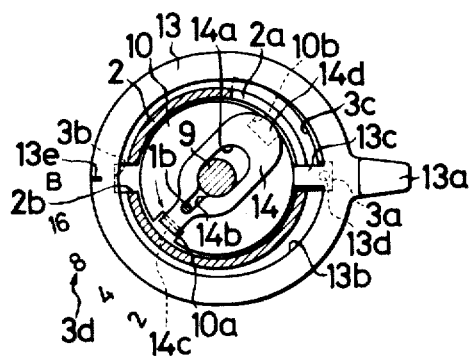
FIG. 4 is a plan view partly in cross section corresponding to FIG. 3 and showing the apparatus at an ordinary exposure time setting.

FIGS. 1 to 4 show the apparatus at usual exposure time settings for taking photographs. When the shutter speed dial 1 is rotated as seen in FIG. 4, the clutch plate 14 in engagement with its pin 1b rotates the disc 10 with the dial 1, shifting the slidable member 8b of the variable resistance VR of the delay circuit 6 shown in FIG. 8 on the resistance member 8a to vary the resistivity of the resistance VR and to thereby vary the time constant of the delay circuit 6. Thus by setting the exposure time scale 1a on the shutter speed dial 1 to the index mark 4 for exposure time setting, a delay time can be set in the exposure time control electric circuit in corresponding relation to the exposure time setting.

The long-time exposure setting member 13 is urged by an unillustrated spring or the like in the same direction as the clutch plate 14, i.e. rightward in FIG. 1, whereby a pin 13d extending from the under surface of the member 13 is engaged in a cutout 3a extending from the bearing bush 2 into the outer plate 3, the arrangement being such that during the usual exposure time setting procedure, the long-time exposure setting member 13 remains locked against rotation of the shutter speed dial 1. In addition, the outer periphery of the disc 10 rotating with the shutter speed dial 1 is positioned at the end of the projection 13c to prevent the member 13 from moving leftward.

Figure 5:
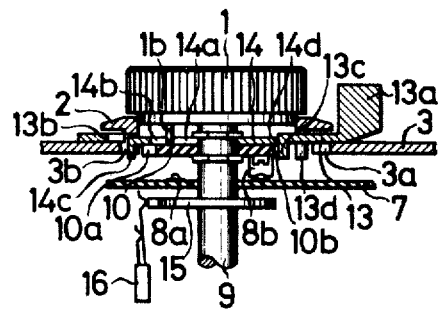
FIG. 5 is a view partly in vertical section corresponding to FIG. 1 and showing a changing-over procedure for setting a long-time exposure.
Figure 6:
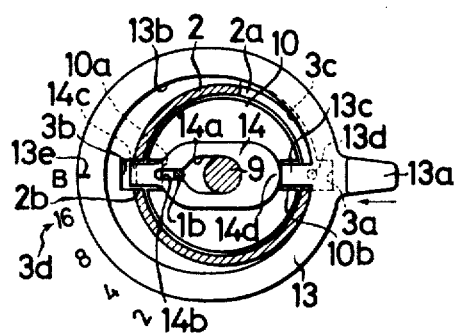
FIG. 6 is a plan view partly in cross section showing the same and corresponding to FIG. 3.

Extending from the bearing bush 2 into the outer plate 3 of the camera is another cutout 3b diametrically opposing the cutout 3a, and adjacent to the cutout 3a there is formed a guide edge 3c with which the pin 13d on the long-time exposure setting member 13 comes into sliding contact for long-time exposure setting. When seen from the bearing bush 2, the guide edge 3c is shallower than the cutout portion 3a. The cutout 3b is provided for long-time exposure setting. The long-time exposure setting member 13 is pushed leftward against the tension acting thereon as seen in FIGS. 5 and 6, causing its projection 13c to push the rear end 14d of the clutch plate 14 and to engage in the cutout 10b in the disc 10. At this time, the bent portion 14c of the clutch plate 14 is pushed out from the cutout 10a and comes into engagement with a cutout 2b in the bush 2 and the cutout 3b of the outer plate 3, whereby the shutter speed dial 1 is prevented from rotation.

The shaft 9 rotatable with the shutter speed dial 1 fixedly carries a cam plate 15, the periphery of which is in contact with the movable contact member of a switch 16 to close the switch 16 with a cam projection 15a only when the dial 1 is set for a bulb exposure marked B. If the dial 1 is set otherwise, the switch 16 is left open.

Figure 8:
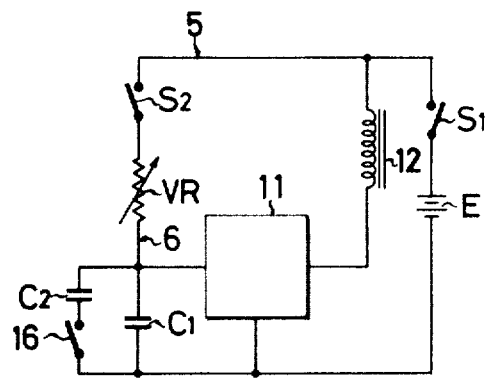
FIG. 8 is a diagram showing an example of the exposure time control electric circuit according to this invention.

As illustrated in FIG. 8, the switch 16 is provided to open the circuit of another capacitor C2 included in the delay circuit 6. Accordingly, when a usual exposure time is set and photograph is taken at this setting, the capacitor C2 is cut off from the delay circuit by the switch 16, but for a long-time exposure to be described below, the capacitor C2 and the other capacitor C1 in parallel therewith are connected to the delay circuit 6. The capacitor C2 has a substantially greater capacity than the capacitor C1.

For long-time exposure setting, the shutter speed dial 1, the exposure time setting member, is rotated to set the mark B to the index mark 4, whereby the large-capacity capacitor C2 is connected to the delay circuit 6 as already described. Subsequently, the long-time exposure setting member 13 is moved leftward as seen in FIGS. 5 and 6 to engage the projection 13c in the cutout 10b in the disc 10. The projection 13c in turn pushes the rear end 14d to force the clutch disc 14 leftward, bringing its bent portion 14c out of the other cutout 10a in the disc 10 into engagement with the cutout 3b extending from the bearing bush 2 into the outer plate 3. The disengagement of the cluth plate 14 from the disc 10 thus effected frees the disc 10 from the shutter speed dial 1, while the engagement of the bent portion 14c of the clutch plate 14 in the cutout 3b locks the shutter speed dial 1 at the position of B setting against rotation.

The leftward movement of the long-time exposure setting member 13 moves its pin 13d out from the cutout 3a in the outer plate 3, permitting the member 13 to rotate in a counterclockwise direction. During the counterclockwise rotation, the pin 13d moves in sliding contact with the guide edge 3c adjacent to the cutout 3a to facilitate the long-time exposure setting operation and also to prevent the member 13 from moving rightward under the tension acting thereon. A window 2a is formed in the bearing bush 2 along the guide edge 3c to permit the entrance of the projection 13c of the long-time exposure setting member 13 and the foregoing rotation of the member 13. The window 2a, in its relation with the projection 13c, serves to determine the range of the above-mentioned rotation of the long-time exposure setting member 13.

Figure 7:
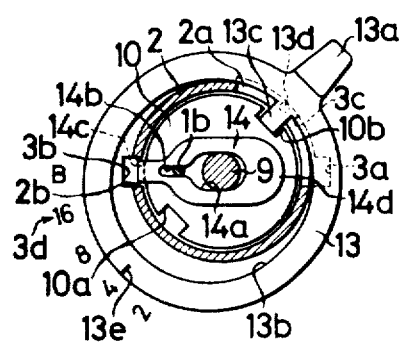
FIG. 7 is a similar view showing the same at a long-time exposure setting.

The long-time exposure setting member 13 is moved in a counterclockwise direction from the position of FIG. 6 to the position of FIG. 7 to set its index mark 13e at a desired exposure time indicated by a long-time exposure scale 3d engraved in the outer plate 3. This causes the projection 13c to rotate the disc 10, which in turn moves the slidable member 8b of the variable resistance VR to change its position on the resistance element 8a. Inasmuch as the shutter speed dial 1 is positioned at the B setting in this case, the large-capacity capacitor C2 is connected to the delay circuit 6, with the result that the time constant determined by the variable resistance VR and capacitors C1 and C2 affords a desired long-time exposure setting.

If the long-time exposure setting member 13 is rotated as above, the projection 13c moves away from the position of the rear end 14d of the clutch plate 14 and frees the end from the pressing contact. Consequently, the clutch plate 14 tends to move rightward under the tension acting thereon, but as shown in FIG. 7, the bent portion 14c is in sliding contact with the outer periphery of the disc 10 to prevent the rightward movement of the plate 14. Moreover, the bent portion 14c engages with the edge of a window 2b formed in the bearing bush 2 in register with the cutout 3b in the outer plate 3 and permitting the entrance of the portion 14c. The clutch plate 14 is therefore prevented from rotation. Briefly, the shutter speed dial 1 is locked against rotation during the operation of the long-time exposure setting member 13.

FIG. 4 shows the apparatus set at an exposure time of one-fourth second by the shutter speed dial 1, FIG. 7 showing the same set at an exposure time of 4 seconds by the long-time exposure setting member 8. At these settings, the slidable member 8b is located at the same position on the resistance element 8a of the variable resistance VR and, accordingly, the variable resistance VR gives the same resistivity. In the case of FIG. 4, the variable resistance VR and capacitor C1 constitute the delay circuit 6, whereas with FIG. 7, the capacitor C2 is further incorporated into the delay circuit 6 to determine its time constant. It therefore follows that by providing the capacitors C1 and C2 such that the total capacity of these capacitors is, for example, 16 times the capacity of the capacitor C1, the same variable resistance VR can be used for setting both ordinary exposure time and long-time exposure.

With reference to FIG. 8, indicated at S1 is a main switch, at S2 a count switch and at E a power source. As previously described, the shutter speed dial 1 or the long-time exposure setting member 13 is operated for exposure time setting and the shutter is then tripped. This closes the main switch S1 first to energize the electromagnet 12 and electrically latches an unillustrated member for effecting a shutter closing action, actuating an unillustrated member for effecting a shutter opening action. At the same time, the count switch S2 is closed to energize the delay circuit 6.

Upon lapse of the set exposure time after the closing of the count switch S2, the switching circuit 11 functions to deenergize the electromagnet 12, which in turn unlatches the shutter closing action effecting member and closes the shutter to complete the exposure.

In the state illustrated in FIG. 4, the disc 10 has its periphery positioned at the end of projection 13c of the long-time exposure setting member 13 and prevents the leftward movement of the setting member 13 as already described. The pin 13d of the setting member 13 is in engagement with the cutout 3a in the outer plate 3 to prevent the rotation of the member 13. It is therefore assured that while the shutter speed dial 1 is not set to the bulb setting B, the long-time exposure setting member 13 is locked, whereas the setting of the shutter speed dial 1 at the B position incorporates the large-capacity capacitor C2 of FIG. 8 into the delay circuit 6 and renders the long-time exposure setting member 13 operable.

While the long-time exposure setting member 13 is in operation at positions other than the B position, the clutch disc 14 is prevented from returning by virtue of the sliding contact of the bent portion 14c with the periphery of the disc 10, the clutch disc 14 further being prevented from rotation by the engagement of the bent portion 14c with the window 2b. Thus the shutter speed dial 1 is held in its locked position. If the long-time exposure setting member 13 is returned to the B setting and relieves the member 14 of the leftward pushing force, the tension acting on the member 13 urges the same rightward, bringing the pin 13d into engagement with the cutout 3a, whereby the member 13 is prevented from rotation. At the same time, the projection 13c moves out from the cutout 10b and thereby disengages from the disc 10.

Simultaneously with this, the clutch plate 14 moves rightward under the spring action, bringing the bent portion 14c out of engagement with the outer plate 3 and bearing bush 2 into engagement with the cutout 10a in the disc 10. The shutter speed dial 1 is now made operable.

Briefly, while one of the setting members is in operation at any position other than the bulb setting B, the other setting member is always held locked, and only while both the setting members 1 and 13 are set to the position of bulb setting B, change-over to an ordinary exposure or to a long-time exposure can be effected to assure exposure time setting reliably. Unillustrated means operates to make a bulb exposure when both the exposure setting member 1 and long-time exposure setting member 13 are set to the bulb setting B.

Figure 9:
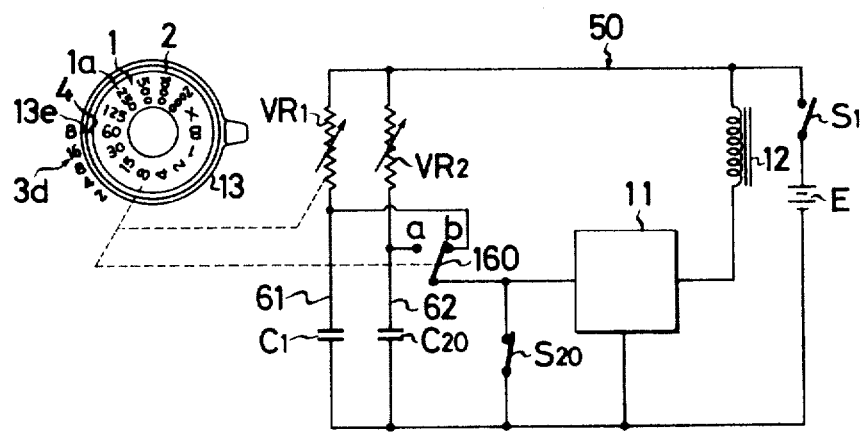
FIG. 9 is a diagram showing another example of the exposure time control electric circuit.
Figure 10:
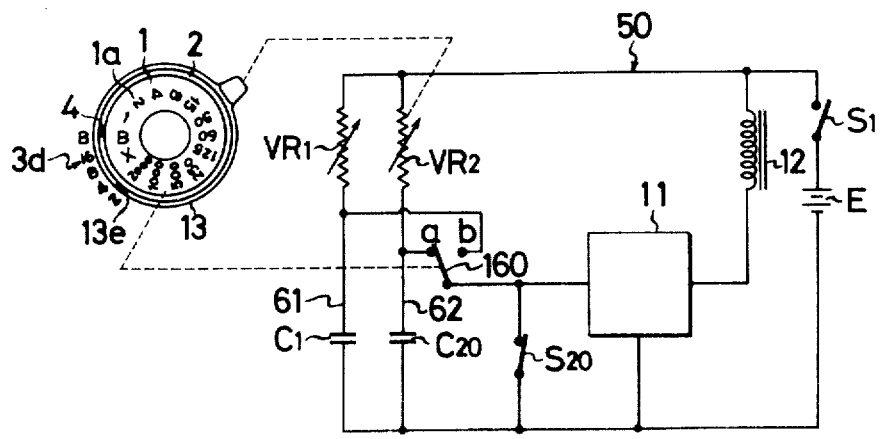
FIG. 10 is a diagram showing the same as it is set for a long-time exposure.

FIGS. 9 and 10 show another example of the exposure time control electric circuit. The exposure time control electric circuit 50 incorporates therein, in parallel arrangement, a delay circuit 61 for setting an ordinary exposure time at small time constant and another delay circuit 62 for setting a long-time exposure at greater time constant increased mainly by the capacity of the capacitor C20. The cam plate 15 (see FIGS. 1 and 7) to be operated by the shutter speed dial 1 serving as the exposure time setting member actuates a change-over switch 160 to selectively energize one of the delay circuits 61 and 62.

More specifically, while the shutter speed dial 1 is operated at a position other than the bulb setting B to set an exposure time, the change-over switch 160 is closed at its contact point *b* to connect the delay circuit 61 to the switching circuit 11 as illustrated in FIG. 9. At the same time, the shutter speed dial 1 varies the resistivity of a variable resistance VR 1.

If the shutter speed dial 1 is set to the position of the bulb setting B, the cam plate 15 changes over the switch 160 and closes the contact point *a* to connect the delay circuit 62 to the switching circuit 11. If the long-time exposure setting member 13 is then operated in the same manner as in the embodiment already described, the resistivity of a variable resistance VR 2 of the delay circuit 62 changes to set a long-time exposure (see FIG. 10).

Since the exposure time control electric circuit 50 of this embodiment has the two variable resistances VR 1 and VR 2, the mechanism of embodiment of FIGS. 1 to 8 may be somewhat modified so as to make the shutter speed dial 1 operable without the necessity to set the long-time exposure setting member 13 to the bulb setting B, whereby the ordinary exposure time or long-time exposure can be set selectively depending on whether the dial 1 is set to the bulb setting B or not. Unillustrated means operates to make a bulb exposure when the exposure setting member 1 and long-time exposure setting member 13 are both set to the bulb setting B.

Inasmuch as the variable resistances VR 1 and VR 2 do not give resistivities over a wide range, the capacitor C20 included in the delay circuit 62 is of course more than ten times as great as the capacitor C1 of the delay circuit 61 in capacity.

The drawings show a power source E, main switch S1 to be closed by a shutter tripping action and count switch S20 which is opened simultaneously with the initiation of a shutter opening action to start to measure the exposure time through the delay circuit 61 or 62.

What is claimed is:

1. A mechanism for adjusting the exposure time in a camera including a shutter timing system adjustable in normal and long exposure ranges, comprising:
    a first setting member movable to adjust said timing system in said normal range;
    a second setting member movable to adjust said timing system in said long exposure range; and
    interlock means releaseably locking one of said setting members against shutter timing system adjustment movement, said respective setting member being releasable for movement in response to a predetermined position of the other setting member.

2. The mechanism of claim 1 wherein said second setting member is releasably locked by said interlock means and is releasable in response to said first setting member being in a predetermined position.

3. The mechanism of claim 1 wherein said first setting member is releasably locked by said interlock means and is releasable in response to said second setting member being in a predetermined position.

4. The mechanism of claim 2 wherein said first setting member is releasably locked by said interlock means and is releasable in response to said second setting member being in a predetermined position.

5. The mechanism of claim 1 wherein said shutter timing system comprises an RC timing network including a variable resistance section, and a capacitance section transferrable between relatively high and low capacitance values in response to said second setting member being in its released operable and lock positions respectively.

6. The mechanism of claim 5 wherein said variable resistance section comprises a variable resistor responsive to the adjustment movement of the setting members.

7. The mechanism of claim 6 wherein said capacitance section comprises a pair of first and second capacitors, said first capacitor being connected in said timing network and said second capacitor being alternatively connected across and disconnected from said first capacitor in response to the release and locking respectively of said second setting member.

8. An apparatus for setting a long-time exposure in a camera comprising:
    an exposure time setting member for setting a desired exposure time within the range of ordinary exposure times,
    a long-time exposure setting member for setting an exposure time longer than the range of exposure times to be set by the exposure time setting member, and
    an intermediate member cooperative with the exposure time setting member and the long-time exposure setting member, the intermediate member permitting long-time exposure setting by means of the long-time exposure setting member only when the exposure time setting member is set in a specified position.

9. The apparatus as set forth in claim 8 wherein said intermediate member further permits ordinary time exposure setting by means of the exposure time setting member only when the long time exposure setting member is set in a specified position.

10. The apparatus as set forth in claim 9 wherein said intermediate member is adapted to releasably lock said exposure time setting member and said long time exposure setting member, said exposure time setting member and said long time exposure setting member, respectively, being released from and locked by said intermediate member when said long time exposure member is set in the specified position, and said exposure time setting member and said long time exposure setting member, respectively, being locked by and released from said intermediate member when said exposure time setting member is set in the specified position.

11. An apparatus for setting a long-time exposure in a camera comprising:
    a manually adjustable exposure time setting member for setting a desired exposure time within an ordinary exposure time,
    a manually adjustable long-time exposure setting member for setting an exposure time longer than any exposure time to be set by the exposure time setting member, and a delay circuit included in an exposure time control electric circuit for determining an exposure time in accordance with its time constant, the delay circuit including an exposure time control element for adjusting the time constant and capacitor means having a first capacitor for an ordinary time exposure and a second capacitor for a long-time exposure, the value of the exposure time control element being settable by the exposure time setting member and the long-time exposure setting member so as to adjust the time constant, and the capacitors and the exposure time control element being so arranged that the second capacitor is connected into the delay circuit so as to increase the capacitance of the capacitor means and that the value of the exposure time control element set by the long-time exposure setting member is made effective when the exposure time setting member is set in a specified position, whereby the time constant is determined by the increased capacitance of the capacitor means and the value of the exposure control element set by the long-time exposure setting member with the exposure time setting member set in the specified position.

12. The apparatus as set forth in claim 11 further comprising an intermediate member which makes the long-time exposure member operable only when the exposure time setting member is set in the specified position.

13. The apparatus as set forth in claim 12 wherein the intermediate member further makes the exposure time setting member operable only when the long-time exposure member is set in a specified position.

14. The apparatus as set forth in claim 12 further comprising an intermediate member which makes the exposure time setting member operable only when the long-time exposure member is set in a specified position.

15. The apparatus as set forth in claim 11 wherein said delay circuit further includes a switch for connecting the second capacitor thereinto, and the exposure control element includes a variable resistor, said variable resistor, said second capacitor and said switch being connected in series with each other and the first and second capacitors being connected in parallel with each other, and the switch being so disposed as to connect the second capacitor into the delay circuit only when the exposure setting member is set in said specified position.

16. An apparatus for setting a long time exposure in a camera comprising:

a manually adjustable exposure time setting member for setting a desired exposure time within an ordinary range;

a manually adjustable long time exposure setting member for setting an exposure time longer than any exposure time to be set by the exposure time setting member; and an exposure control circuit which comprises a first delay circuit including a first capacitor for an ordinary time exposure and a first exposure control element whose value is settable by the exposure time setting member, a second delay circuit including a second capacitor for a long time exposure having a larger capacitance than that of the first capacitor and a second exposure time control element whose value is settable by the long time exposure setting member, and a change-over switch for disconnecting the second delay circuit from the exposure control circuit when setting an exposure time within the ordinary range, the change-over switch being operable to disconnect the first delay circuit from the exposure control circuit and connect the second delay circuit to the same when the exposure time setting member is set in a specified position.

* * * * *